JAMES H. CRANDELL.
Improvement in Wine Press.
No. 118,911.  Patented Sep. 12, 1871.
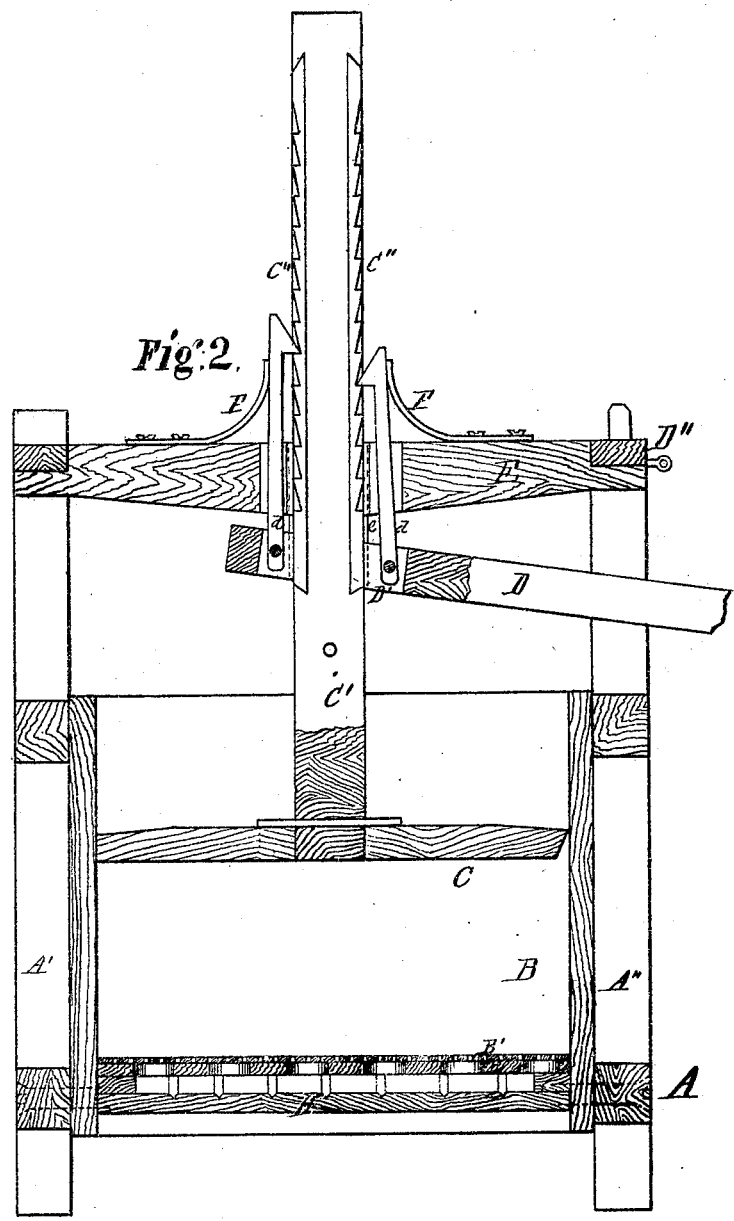
Witnesses
E. H. Bates
Chas. M. Lenoue
Inventor:
Jas. H. Crandell,
Chipman Hosmer & Co
Attys,

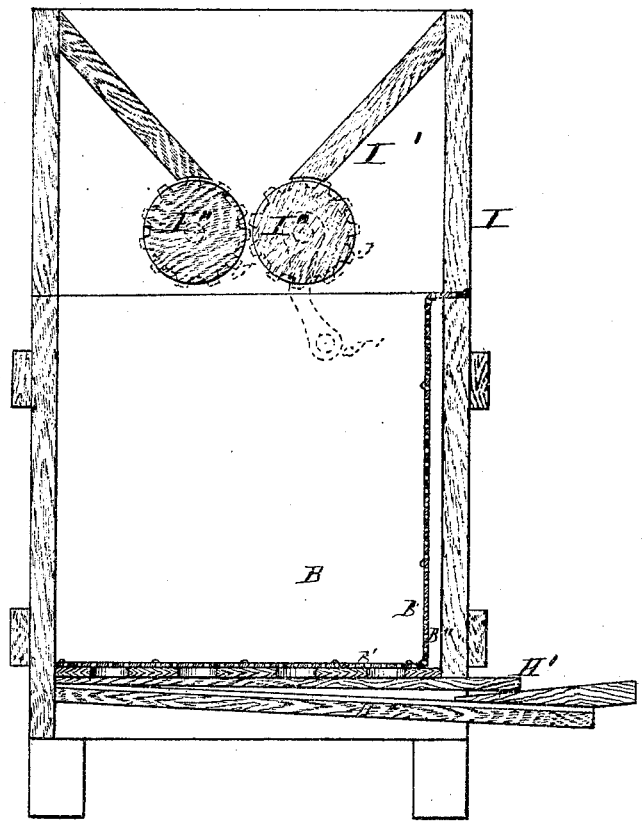

UNITED STATES PATENT OFFICE.

JAMES H. CRANDELL, OF UPPER MARLBOROUGH, MARYLAND.

IMPROVEMENT IN WINE-PRESSES.

Specification forming part of Letters Patent No. 118,911, dated September 12, 1871.

*To all whom it may concern:*

Be it known that I, JAMES H. CRANDELL, of Upper Marlborough, in the county of Prince George's and State of Maryland, have invented a new and valuable Improvement in Domestic Wine-Presses; and I do hereby declare that the following is a full, clear, and exact description of the construction and operation of the same, reference being had to the annexed drawing making a part of this specification, and to the letters and figures of reference marked thereon.

Figure 1 of the drawing is a representation of a vertical transverse section of part of my invention, fruit-mashing apparatus in place. Fig. 2 is a vertical longitudinal section of improved press. Fig. 3 is a plan view of improved tool, hereinafter described.

This invention has relation to an improved machine for extracting the juice from apples and other fruit for the purpose of making cider, wine, &c.; and the novelty consists in the construction and novel arrangement of devices, whereby the fruit is broken between rollers and afterward pressed, by the means hereinafter described.

Referring to the drawing, A represents an upright rectangular frame, composed of four corner uprights, A A″, connected by suitable cross-beams. B represents a strong box or tank, supported in the frame A, and open topped. The bottom of said box is perforated and covered with a metallic strainer, B′, which extends over one side of the box inclosing a chamber, B″, which communicates with the perforations in the bottom. C designates a follower, attached to the lower end of a four-sided standard, C′, which holds on each of two opposite sides a bevel-toothed rack, C″. A slotted lever, D, holds a pair of upright dogs, d, which, being pivoted within the slot D′ of the lever D, engage with the teeth of said rack. The standard C′ passes through the slot D′, and also through a bar, E, which is hinged to two of the uprights of the frame, and holds a mortised cross-piece, D″, which fits on the tenoned ends of the two opposite uprights A″. The lever D is hinged to the bar E by means of the clips e, and when it is actuated it serves to alternately raise and lower the dogs d. Thus, when one dog is brought down it carries with it the follower-standard; at the same time the other dog is raised and engages with the next higher tooth, and in its turn operates the follower. A pair of springs, F, secured to the bar E, presses against the dogs and keeps them in contact with the rack. When it is required to raise the follower the dogs are spread apart and thrown out of position by the detachable device or spreader shown in Fig. 3. This device consists of a pair of levers, G, connected by links G′, and constructed with wedge-shaped ends. These ends are to be inserted between the dogs and the follower-standard, and then spread apart by bringing the other ends of the levers toward each other. This operation releases the dogs from the racks and allows the follower to be readily raised. Underneath the box B is arranged an inclined board, H, having a number of channels cut in its face to carry off the juice which escapes from the box to a suitable receptacle. A wedge-shaped board, H′, fitting closely the space between the bottom of the box B and the board H, is provided, and inserted, when necessary, to prevent the juice from escaping. The upper surface of the board H is slightly concave, so as to direct the fluid toward the center and keep it from flowing over the edges and wasting. When the fruit in the box is pressed by the follower the juice passes through the strainers both at the side and bottom of the box.

In Fig. 1 is shown the mechanism which is provided for the purpose of breaking the fruit preparatory to its being pressed.

I represents the box which fits on top of the press-tank, the pressing devices being thrown back out of the way through the medium of the hinged bar E. The box I contains a hopper, I′, and underneath it a pair of parallel rollers, I″. The shaft of each of these rollers holds a gear-wheel, J, which engage with each other. Motion is given to the rollers by means of a crank, J′, fitted to the shaft of one of them. The fruit is placed in the hopper, and, according as it is mashed, falls into the tank below. When sufficient has been accumulated the box I is removed and the press put in operation, as described.

I claim as my invention—

1. The box I having the hopper I′, rollers I″, gear-wheels J, and crank J′ or equivalent devices for grinding the fruit, in combination with the fruit-press having the follower C, standard C′, arm D, dogs d, racks C″, and hinged bar E, constructed as described, said box and press mechanism being used interchangeably, as and for the purpose specified.

2. The combination and arrangement of the strainer B', chamber B'', and press-follower C, as and for the purpose set forth.

3. In combination with the dogs $d$, the detachable spreader, constructed as described and shown, as and for the purpose set forth.

In testimony that I claim the above I have hereunto subscribed my name in the presence of two witnesses.

JAMES H. CRANDELL.

Witnesses:
F. B. CURTIS,
D. D. KANE.